United States Patent
Tanaka et al.

(10) Patent No.: US 10,967,732 B2
(45) Date of Patent: Apr. 6, 2021

(54) FUEL TANK

(71) Applicant: HONDA MOTOR CO., LTD., Tokyo (JP)

(72) Inventors: Kotaro Tanaka, Wako (JP); Nao Sato, Wako (JP); Takeharu Yoshihashi, Wako (JP); Toshiharu Fukushima, Wako (JP); Susumu Murayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 119 days.

(21) Appl. No.: 16/281,575

(22) Filed: Feb. 21, 2019

(65) Prior Publication Data

US 2019/0255936 A1 Aug. 22, 2019

(30) Foreign Application Priority Data

Feb. 22, 2018 (JP) .............................. JP2018-029372

(51) Int. Cl.
*B60K 15/03* (2006.01)
*B29C 49/04* (2006.01)
(Continued)

(52) U.S. Cl.
CPC ........ *B60K 15/03177* (2013.01); *B29C 49/04* (2013.01); *B29C 49/20* (2013.01); *B29L 2031/7172* (2013.01); *B32B 5/024* (2013.01); *B32B 27/32* (2013.01); *B32B 2262/12* (2013.01); *B32B 2439/40* (2013.01);
(Continued)

(58) Field of Classification Search
CPC .... B60K 15/03177; B60K 2015/03032; B60K 2015/03046; B60K 2015/03059; B60K 15/03; B60K 2015/03486; B60K 2015/03375; B29C 49/04; B29C 49/20; B29C 2049/2414; B29C 2049/2402; B29C 2049/047; B29C 2791/007; B29C 2049/026; B29C 2791/006; D03D 15/0027; D03D 13/004; D03D 2700/0133; D03D 11/00; D03D 15/00; B32B 5/024; B32B 2262/12; B32B 2439/40; B32B 27/32; B29L 2031/7172; D10B 2505/02;
(Continued)

(56) References Cited

U.S. PATENT DOCUMENTS 6,605,343 B1 * 8/2003 Motoi ..................... B32B 27/04
428/298.1
8,342,358 B2 * 1/2013 Kobayashi ....... B60K 15/03177
220/563
(Continued)

FOREIGN PATENT DOCUMENTS

JP S61-102452 A 5/1986
JP 2005-313346 A 11/2005

*Primary Examiner* — Kareen K Thomas
(74) *Attorney, Agent, or Firm* — Rankin, Hill & Clark LLP (57) ABSTRACT

A fuel tank includes: a tank main body made of a resin material; and a cover member which is formed using threads made of a fiber-reinforced composite material containing a thermoplastic resin fusible to a surface of the tank main body. The cover member has a twill weave structure at least in its portion fused to the upper surface of the tank main body. The threads each have a core-sheath structure in which a fiber made of a polypropylene resin is coated with a polyethylene resin.

6 Claims, 9 Drawing Sheets

(51) Int. Cl.
   *B29C 49/20*   (2006.01)
   *D03D 15/00*   (2021.01)
   *D03D 13/00*   (2006.01)
   *B32B 5/02*    (2006.01)
   *B29L 31/00*   (2006.01)
   *B32B 27/32*   (2006.01)

(52) U.S. Cl.
   CPC ....... *D03D 13/004* (2013.01); *D03D 15/0027* (2013.01); *D03D 2700/0133* (2013.01); *D10B 2321/021* (2013.01); *D10B 2321/022* (2013.01); *D10B 2505/02* (2013.01)

(58) Field of Classification Search
   CPC ........ D10B 2321/022; D10B 2321/021; B29K 2223/06; B29K 2223/12
   See application file for complete search history.

(56)       References Cited

U.S. PATENT DOCUMENTS

| | | | |
|---|---|---|---|
| 10,767,600 B2* | 9/2020 | Oakden-Graus | F02B 75/18 |
| 2002/0125254 A1* | 9/2002 | Hagano | B60K 15/077 |
| | | | 220/562 |
| 2003/0002997 A1* | 1/2003 | Hazama | F02M 37/103 |
| | | | 417/360 |
| 2003/0037831 A1* | 2/2003 | Nakamura | B32B 27/34 |
| | | | 138/177 |
| 2003/0213527 A1* | 11/2003 | Yanase | F02M 25/0836 |
| | | | 141/59 |
| 2005/0077643 A1* | 4/2005 | Matsuoka | F16J 12/00 |
| | | | 264/103 |
| 2005/0115054 A1* | 6/2005 | Brandner | B29C 49/22 |
| | | | 29/592 |
| 2006/0207991 A1* | 9/2006 | Sugiura | B60K 15/03177 |
| | | | 220/563 |
| 2009/0000686 A1* | 1/2009 | Tsutsumi | B32B 1/02 |
| | | | 138/141 |
| 2015/0274311 A1* | 10/2015 | Briand | B32B 27/12 |
| | | | 220/560.01 |
| 2016/0257195 A1* | 9/2016 | Tanabe | B60K 15/067 |
| 2017/0217075 A1* | 8/2017 | De Keyzer | B29C 49/04 |
| 2017/0326974 A1* | 11/2017 | Shoji | B60K 15/067 |
| 2018/0036916 A1* | 2/2018 | Pettey | B29C 33/3842 |
| 2018/0043770 A1* | 2/2018 | Hirano | B62J 35/00 |
| 2019/0126745 A1* | 5/2019 | Amano | B60K 15/03177 |
| 2019/0240890 A1* | 8/2019 | Yoshihashi | B60K 15/03177 |
| 2020/0072416 A1* | 3/2020 | Yoshida | F17C 1/06 |

* cited by examiner

FIBER DIRECTION 0°

FIG. 9B

FIBER DIRECTION 45°

DOUBLE TWILL

FIG.11B

IRREGULAR SATIN WEAVE

FUEL TANK

BACKGROUND OF THE INVENTION

1. Field of the Invention

The present invention relates to reinforcement of a resin-made fuel tank.

2. Description of the Related Art

Japanese Patent Application Publication No. Sho 61-102452 discloses use of a fiber-reinforced plastic, including carbon fibers, polyaramide fibers, glass fibers or the like as reinforcement fibers, in the form of a weave fabric. Meanwhile, Japanese Patent Application Publication No. 2005-313346 discloses use of a fiber-reinforced resin composite material in the form of a multi-weave fabric.

SUMMARY OF THE INVENTION

A resin-made fuel tank used in a vehicle expands since the pressure inside the fuel tank becomes higher due to a gas produced through volatilization of fuel. The tank itself expands due to infiltration and permeation of the fuel into and through resin of the tank since the tank is made of the resin instead of the pressure of the gas. Neither Japanese Patent Application Publication No. Sho 61-102452 nor Japanese Patent Application Publication No. 2005-313346 has examined use of a fiber-reinforced resin as means for inhibiting the expansion of the fuel tank.

The present invention has been made to solve the above problems, and an object thereof is to provide a resin-made fuel tank capable of inhibiting its expansion.

The present invention is a fuel tank characterized in that the fuel tank includes: a tank main body made of a resin material; and a cover member which is formed using threads made of a fiber-reinforced composite material containing a thermoplastic resin fusible to an upper surface of the tank main body, in which the cover member has a twill weave structure at least in its portion fused to the upper surface of the tank main body.

The present invention can provide the fuel tank capable of inhibiting the expansion of the resin-made tank.

DETAILED DESCRIPTION OF THE EMBODIMENTS

Fuel tanks according to embodiments of the present invention will be hereinafter described in detail with reference to the accompanying drawings depending on the necessity. The following descriptions will be provided using an example of a fuel tank 1 which is used in a four-wheeled vehicle. However, what type of vehicle the fuel tank 1 is usable in is not limited to the four-wheeled vehicle. The fuel tank 1 is usable in various types of vehicles such as a three-wheeled vehicle and a two-wheeled vehicle.

FIRST EXAMPLE

Figure 1:
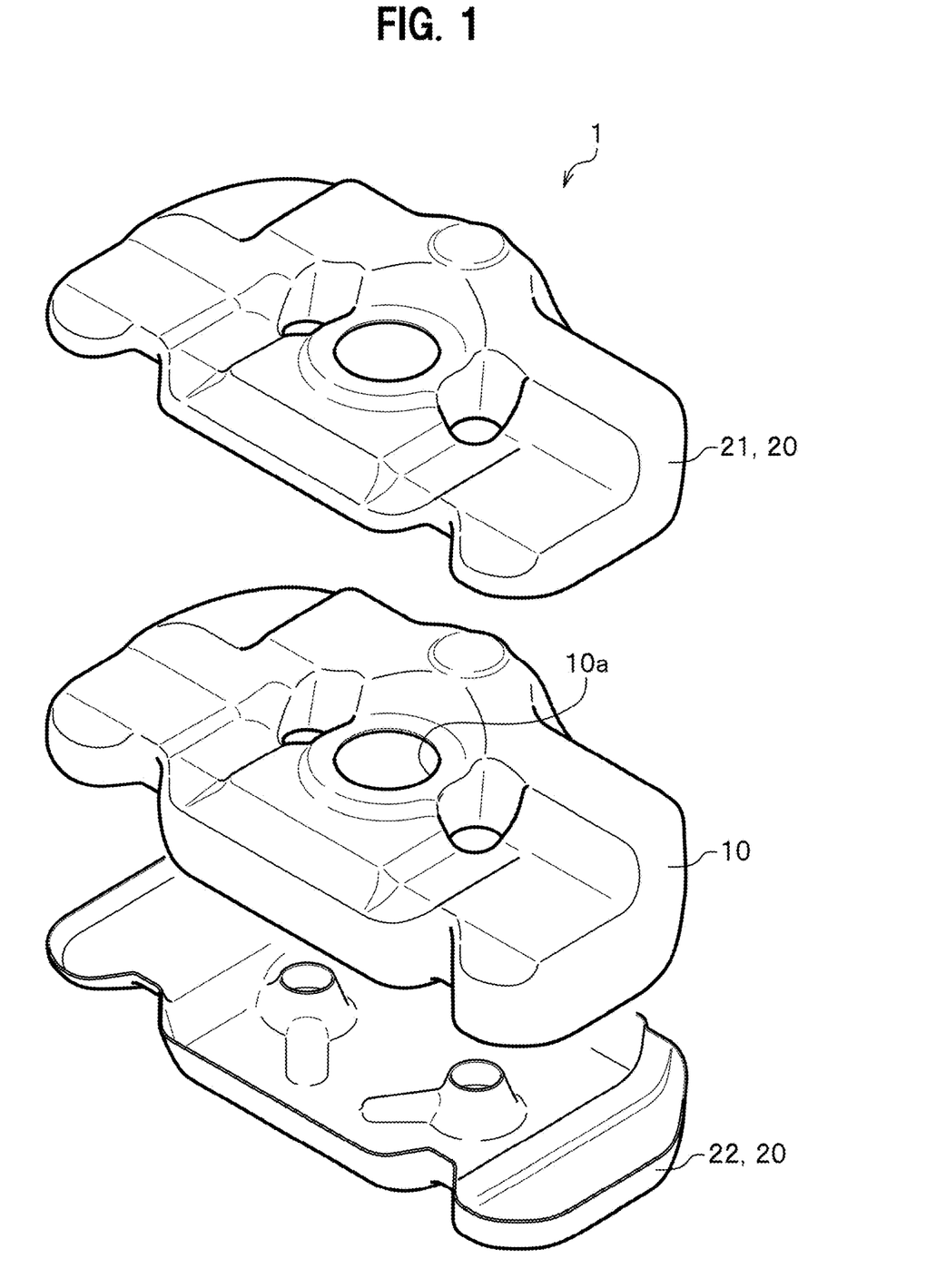
FIG. 1 is a perspective diagram showing a fuel tank according to a first embodiment with a tank main body and a cover member separated from each other.

FIG. 1 is a perspective diagram showing a fuel tank according to a first embodiment with a tank main body and a cover member separated from each other.

As shown in FIG. 1, the fuel tank (automobile fuel tank) 1 includes: a tank main body 10 in which to holding fuel (gasoline or the like); and a cover member 20 which reinforces the tank main body 10. The fuel tank 1 is attached and fixed to a vehicle body of an automobile (not shown).

The tank main body 10 is formed in a flat shell (hollow) shape, and is arranged under the floor or the like of the vehicle. The tank main body 10 is provided in its upper surface with things such as: a pump attachment hole 10a into which to attach a pump or the like; an attachment hole (not shown) to which to connect a hose for collecting fuel vapor from the inside of the fuel main body 10; and an attachment hole (not shown) to which to connect a return pipe (not shown). The fuel tank main body 10 is further provided in its side surface with a fuel inlet through which to pour fuel from an inlet pipe (not shown). Incidentally, the tank min body 10 is formed, for example, by blow molding, extrusion sheet molding, or the like.

The cover member 20 includes: an upper cover part 21 arranged above the tank main body 10; and a lower cover part 22 arranged under the tank main body 10. The upper cover part 21 is formed in a shape corresponding to the complicated shape of an upper surface of the tank main body 10. The lower cover part 22 is formed in a shape corresponding to the complicated shape of a lower surface of the tank main body 10. Before the tank main body 10 is formed, the upper and lower cover parts 21, 22 are formed using a metal mold such that the shapes of the upper and lower cover parts 21, 22 agree with the surface shape of the tank main body 10. Furthermore, while the tank main body 10 is being formed, the upper and lower cover parts 21, 22 and the tank main body 10 are integrated into a single unit by fusing the upper and lower cover parts 21, 22 onto the surface of the tank main body 10.

Figure 2:
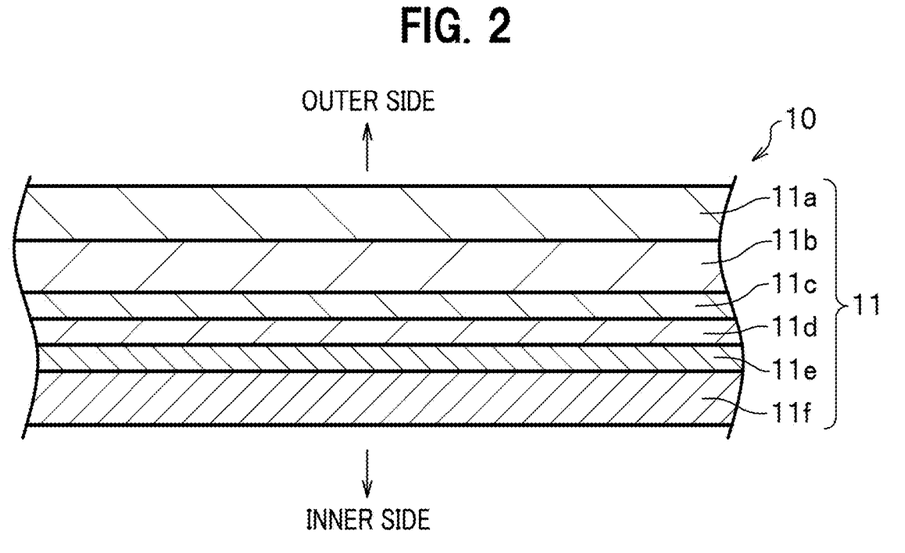
FIG. 2 is a cross-sectional diagram of a wall surface of the tank main body.

FIG. 2 is a cross-sectional diagram of a wall surface of the tank main body.

As shown in FIG. 2, the wall (side wall) 11 of the tank main body 10 includes, for example, a top skin layer 11a, an outer base layer 11b, an outer adhesive layer 11c, a barrier layer 11d, an inner adhesive layer 11e, and an inner base layer 11f in an order from the outside to inside of the tank. Like this, the wall 11 of the tank main body 10 is made of the multiple synthetic resin layers (resin material).

In the wall 11 of the tank main body 10, an inner main body layer (including the inner adhesive layer 11e and the inner base layer 11f) is formed inward of the barrier layer 11d, while an outer main body layer (including the top skin layer 11a, the outer base layer 11b, and the outer base layer 11c) is formed outward of the barrier layer 11d. In the other words, the wall 11 of the tank main body 10 is formed with a multilayered cross-sectional structure in which the barrier layer 11d made of a material excellent in fuel impermeability is inserted at least between the inner thermoplastic resin layer forming the inner surface of the tank and the outer thermoplastic resin layer forming the outer surface of the tank.

The top skin layer 11a and the outer base layer 11b are made of a thermoplastic synthetic resin which has large impact resistance and is capable of maintaining rigidity against the fuel. Examples of the thermoplastic synthetic resin include polyethylene resin, polyamide resin, and polyester resin. It is preferable that in a case where the top skin layer 11a is made of polyethylene, such polyethylene be high-density polyethylene (HDPE).

Meanwhile, in a case where the outer base layer 11b is made of polyethylene, its regrind material may be used. For example, the regrind material containing high-density polyethylene (HDPE) as its main ingredient may be used which is obtained by crushing fuel tanks collected after their use, fuel tanks judged as defective items during the manufacturing process, and similar things to be recycled.

The outer adhesive layer 11c is provided between the outer base layer 11b and the barrier layer 11d, and bonds the outer base layer 11b and the barrier layer 11d together. An example of an adhesive synthetic resin to be used as the outer adhesive layer 11c is modified polyolefin resin. Particularly, unsaturated carboxylic acid modified polyolefin resin is preferable.

In the first embodiment, although the outer main body layer includes the top skin layer 11b, the outer base layer 11b and the outer adhesive layer 11c, the outer main body layer is not limited to this configuration. For example, the outer main body layer may include the top skin layer 11a and the barrier layer 11d which are directly bonded together with the outer base layer 11b and the outer adhesive layer 11c omitted from the outer main body layer.

It is preferable that the barrier layer 11d be made of a thermoplastic synthetic resin which allows little fuel to pass through, for example, an ethylene vinylalcohol copolymer (EVOH). The use of the ethylene vinylalcohol copolymer (EVOH) as the barrier layer 11d makes it possible to enhance the quality of preventing gasoline from permeating through the barrier layer 11d.

The inner adhesive layer 11e is provided between the barrier layer 11d and the inner base layer 11f, and bonds the barrier layer 11d and the inner base layer 11f together. As example of an adhesive synthetic resin to be used as the inner adhesive layer 11e is modified polyolefin resin, as in the case of the outer adhesive layer 11c. Particularly, unsaturated carboxylic acid modified polyolefin resin is preferable.

Like the top skin layer 11a, the inner base layer 11f is made of a thermoplastic synthetic resin. Examples of the thermoplastic synthetic resin include polyethylene resin, polyamide resin, and polyester resin. It is preferable that in a case where the inner base layer 11f is made of polyethylene resin, such polyethylene be high-density polyethylene (HDPE).

Figure 3A:
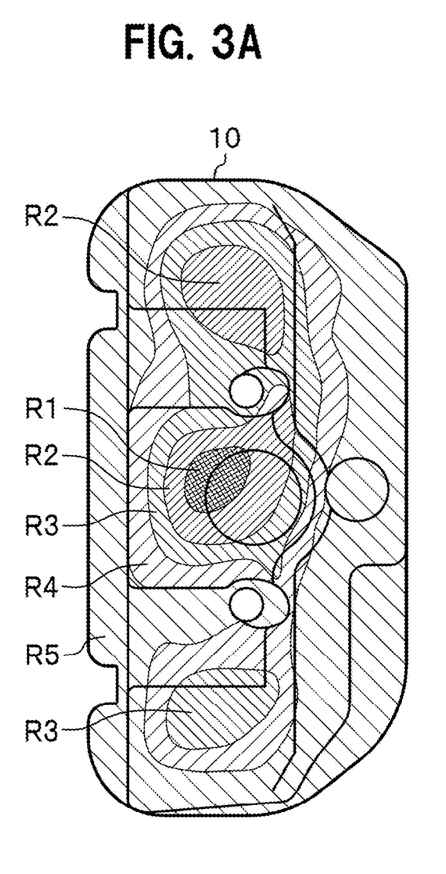
FIGS. 3A and 3B are, respectively, top and bottom diagrams of the tank main body, and show how displacement of the tank main body is distributed.
Figure 3B:
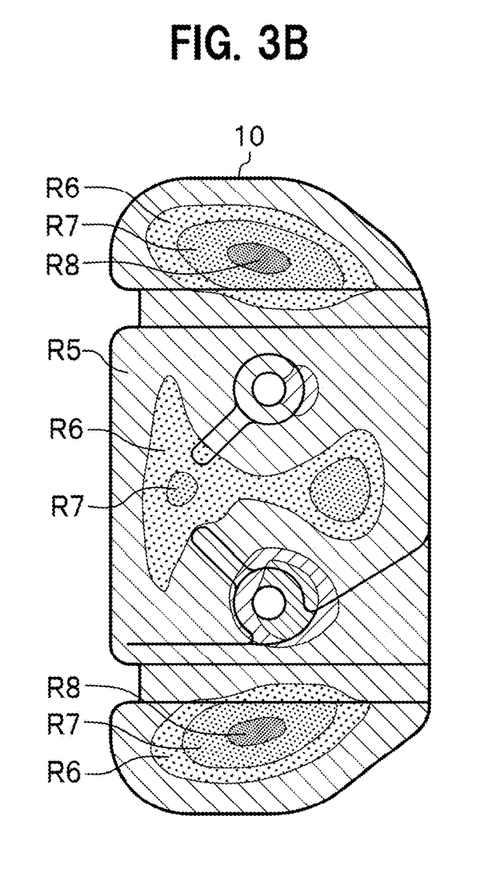

FIGS. 3A and 3B are, respectively, top and bottom diagrams of the tank main body, and show how displacement of the tank main body is distributed. Incidentally, FIGS. 3A and 3B illustrate the tank main body 10 as reinforced with no cover member 20.

Once the tank main body 10 is supplied with highly volatile fuel such as gasoline, a gas volatilized from the fuel produce a force which expands the tank main body 10. As the fuel is consumed, the lower portion of the inside of the fuel main body 10 contains the liquid fuel, while the upper portion of the inside of the fuel main body 10 becomes empty. Thus, the inside of the tank main body 10 receives a force in the vertically upward direction due to the pressure of the gas produced through the volatilization. The tank main body 10 accordingly expands more easily on its upper side than on its lower side.

As shown in FIG. 3A, the upper surface of the tank main body 10 expands most (its amount of displacement (deformation) becomes largest) in an area indicated with reference sign R1. Furthermore, the amount of displacement is smaller in an area R2 than in the area R1. The amount of displacement is smaller in an area R3 than in the area R2. The amount of displacement is smaller in an area R4 than in the area R3. The amount of displacement is smaller in an area R5 than in the area R4.

As shown in FIG. 3B, the lower surface of the tank main body 10 expands least (its amount of displacement (deformation) becomes smallest) in an area R8. Furthermore, the amount of displacement is larger in an area R7 than in the area R8. The amount of displacement is larger in an area R6 than in the area R7. The amount of displacement is larger in an area R5 than in the area R6.

As clear from this result, the amount of deformation of the fuel tank is larger in the upper surface than in the lower surface, and the fuel tank accordingly expands more easily in the upper surface than in the lower surface.

With this taken into consideration, the inventors have earnestly studied what conditions are required to inhibit the expansion of the fuel tank by use of fabrics formed by weaving threads made of a fiber-reinforced composite material containing thermoplastic resin fusible to the surface of the tank main body 10. The inventors have found four important conditions as follows. The conditions include (1) weight per unit area, (2) elongation in vertical and horizontal directions, (3) smoothness of fabric surface, and (4) thread elongation.

(1) The weight per unit area is a condition related to the rigidity of the cover member 20. (2) The elongation in the vertical and horizontal directions is a condition related to the cover member 20's inhibition of the deformation of the tank main body 10. (3) The smoothness of the fabric surface is a condition related to ease with which the cover member 20 is fused to the tank main body 10. (4) The thread elongation is a condition related to the moldability of the cover member 20. Detailed descriptions will be hereinbelow provided for the four conditions.

Figure 4A:
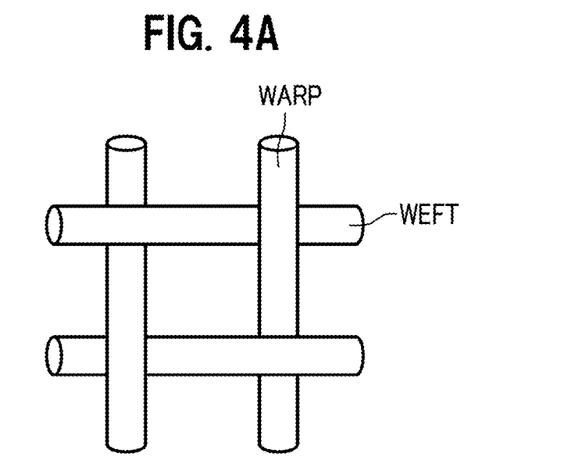
FIGS. 4A, 4B and 4C are, respectively, diagrams showing plain, twill and satin weaves of the three basic weaves.
Figure 4B:
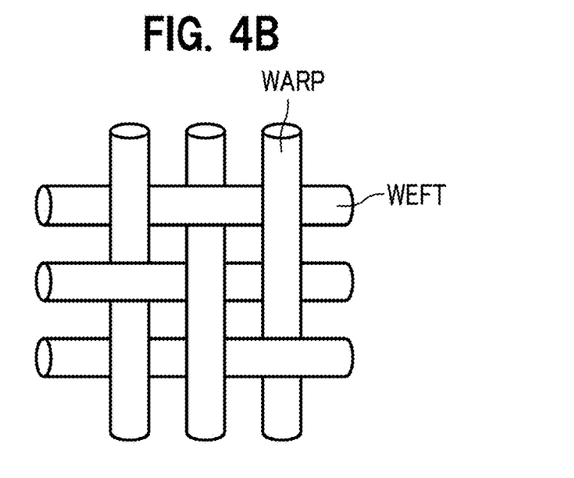
Figure 4C:
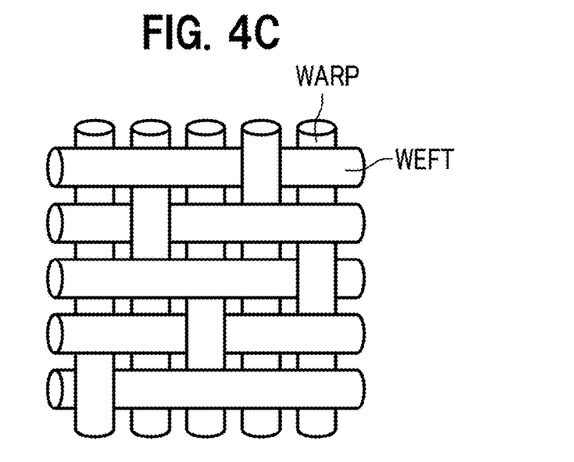

To begin with, descriptions will be provided for (1) the weight per unit area. FIGS. 4A, 4B and 4C are, respectively, diagrams showing plain, twill and satin weaves of the three basic weaves. Incidentally, the weight per unit area means the weight of threads per unit area. For example, as the weight per unit area becomes larger, the rigidity becomes higher since the threads are arranged more densely.

In the plain weave shown in FIG. 4A, each warp thread crosses the weft threads by going over one, then under the next, and so on. In the plain weave, the warp threads and the weft threads are arranged with a 1:1 ratio.

In the twill weave shown in FIG. 4B, for example, each warp thread passes over two weft threads then under one weft thread, and so on. In the twill weave, points where the warp threads crossover the weft threads continue diagonally.

In the satin weave shown in FIG. 4C, for example, each warp thread passes over three or more weft threads then under one weft thread, and so on. In the satin weave, points where the warp threads and the weft threads cross over are not adjacent to one another.

As discussed above, the plain weave is not anisotropic, and the performance of the plain weave is stable. The plain weave, however, has many weave points (points where the warp threads and the weft threads cross over each other, and hereinafter referred to as "cross points"), and gaps are likely to occur in the plain weave. Accordingly, the rigidity per unit area of the plain weave is lower. In contrast, the satin weave has fewer weave points (cross points), and accordingly have a larger weight per unit area to have a higher rigidity. However, the satin weave is vulnerable to fiction with a metal mold during the molding. In addition, since the number of weave points (cross points) is small, the fibers easily become unraveled (easily become separated). On the other hand, the twill weave comes between the plain weave and the satin weave. With these taken into consideration, we have obtained a result that it is preferable that the twill weave be employed since: the twill weave (twill weave structure) has a larger weight per unit area than the plain weave, and can secure sufficient rigidity; and the ratio of the weave points (cross points) is 2:1, and the twill weave has the sufficient number of weave points (cross points) to satisfy the conditions required for the fuel tank 1.

Figure 5:
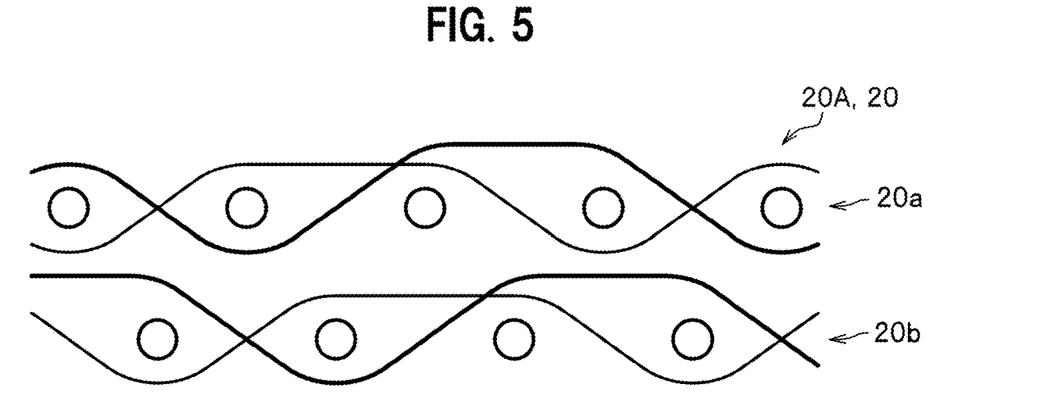
FIG. 5 is a cross-sectional diagram showing the twill weave cover member.

FIG. 5 is a cross-sectional diagram showing a cover member using the twill weave.

As shown in FIG. 5, a cover member 20A (20) includes a single twill weave sheet 20a and a single twill weave sheet 20b which are stacked and fused together (hereinafter referred to as "twills"). In other words, the cover member 20A includes two separated fabrics, that is to say, the upper sheet 20a and the lower sheet 20b. Because of the two twill weaves (twill weave structure), that is to say, the sheets 20a, 20b, the cover member 20 applied to the fuel tank 1 (see FIG. 1) can have an increased weight per unit area, and accordingly enhances the rigidity of the cover member 20.

Figure 6:
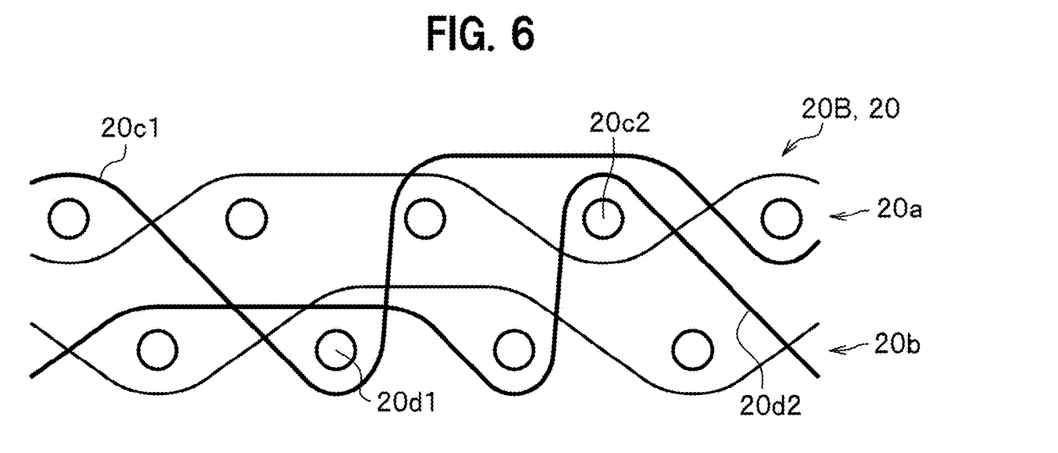
FIG. 6 is a cross-sectional diagram showing a modification of the twill weave cover member.

FIG. 6 is a cross-sectional diagram showing a modification of the twill weave cover member.

As shown in FIG. 6, a cover member 20B (20) includes single twill weave sheets 20c, 20d which are stacked together (hereinafter referred to as a "double-twill weave"). The warp threads 20c1 of the sheet 20c (the first sheet) cross the weft threads 20d1 of the sheet 20d (the second sheet) with the sheets 20c, 20d facing each other. Meanwhile, the warp threads 20d2 of the sheet 20d (the second sheet) cross the weft threads 20c2 of the sheet 20c (the first sheet) with the sheets 20c, 20d facing each other. In other words, the cover member 20B is formed of a single fabric obtained by joining the upper sheet 20c and the lower sheet 20d. The use of this multi-twill weave structure (twill weave structure) in which the vertically stuck sheets 20c, 20d are joined together by the crossing threads makes it possible to obtain the cover member 20B with a higher rigidity.

Next, descriptions will be provided for the elongation in the vertical and horizontal directions. Strength of the cover member 20 against the elongation in the vertical and horizontal directions makes it possible for the cover member 20 to exert an effect of inhibiting the expansion of the fuel tank 1. In other words, when the tank main body 10 expands, if the cover member 20 elongates in response to the expansion of the tank main body 10, the cover member 20 cannot inhibit the expansion of the tank main body 10. This requires the cover member 20 not to elongate, or to be hard to elongate, while the fuel tank 1 is in use.

Since the twill weave has many weave points (cross points), the twill weave has a property of strength against being pulled (a non-elongation property) both in the vertical direction (warp direction) and in the horizontal direction (weft direction). The cover member 20 with the twill weave structure can inhibit the expansion of the tank main body 10 even when a force which expands the tank main body 10 occurs.

Figure 7:
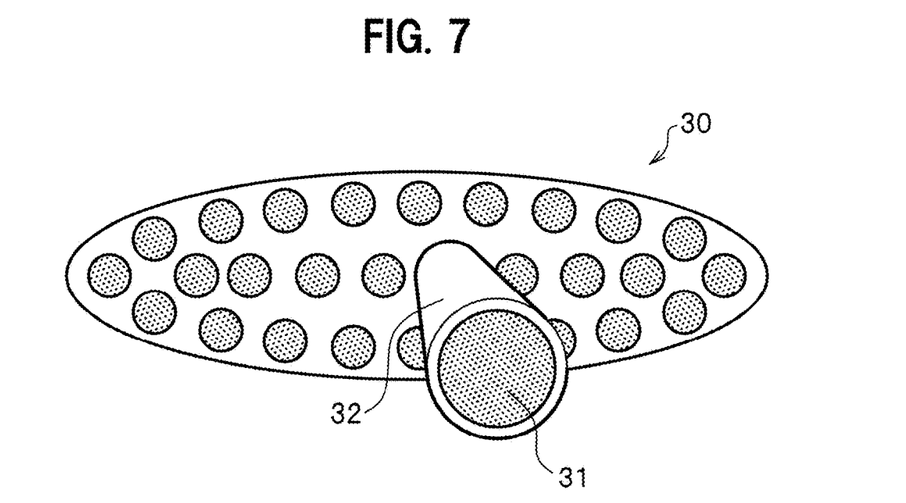
FIG. 7 is a cross-sectional diagram threads made of a fiber-reinforced composite material, and used for the cover member.

FIG. 7 is a cross-sectional diagram showing threads made of fiber-reinforced composite material, and used for the cover member.

As shown in FIG. 7, a thread 30 includes multiple core materials 31 (fibers) made of a polypropylene resin (PP), and a sheath material 32 (matrix resin) made of a polyethylene resin (PE) such that: each core material 31 (fiber) has a core-sheath structure in which the core material 31 (fiber) is coated with the sheath material 32 (matrix resin); and the sheath material 32 (matrix resin) is melted. FIG. 7 shows how a single thread (a strand of fibers) is. Threads are woven as warp threads and weft threads to form a sheet with the twill weave structure, and two weave sheets are formed into the cover member 20. The PP-PE fiber like this is referred as polypropylene fiber-reinforced thermoplastics (PPFRTP). Furthermore, the use of the PP-PE fiber like this for the cover member 20 makes it possible to make the cover member 20 good in moldability and economical in costs.

The thread made of the fiber-reinforced composite material including the thermoplastic resin is not limited to one made of the PP-PE fiber. Fibers made of other fiber-reinforced resins may be used, and examples of such fibers include a glass fiber coated with the thermoplastic resin (GFRTP), and a carbon fiber coated with the thermoplastic resin (CFRTP).

Figure 8A:
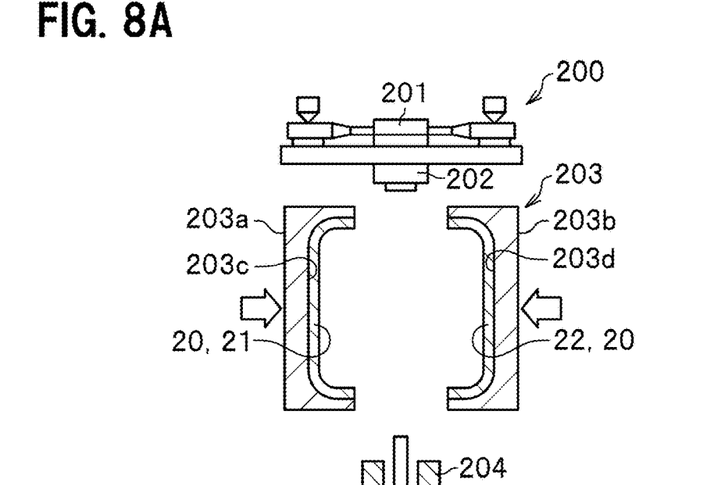
FIGS. 8A to 8C are diagrams showing a fuel tank manufacturing process.
Figure 8B:
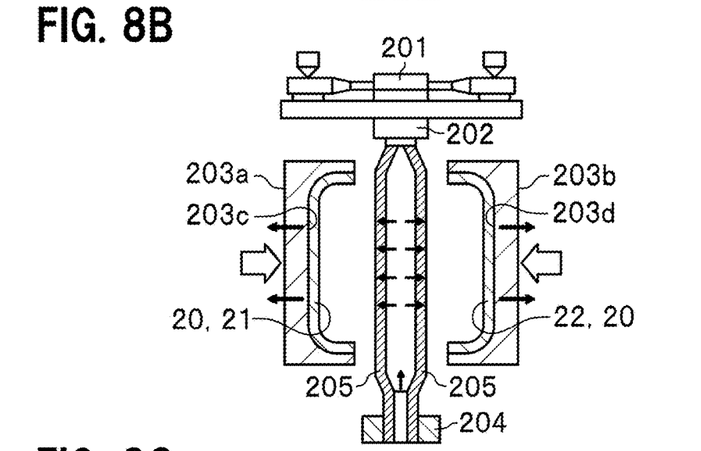
Figure 8C:
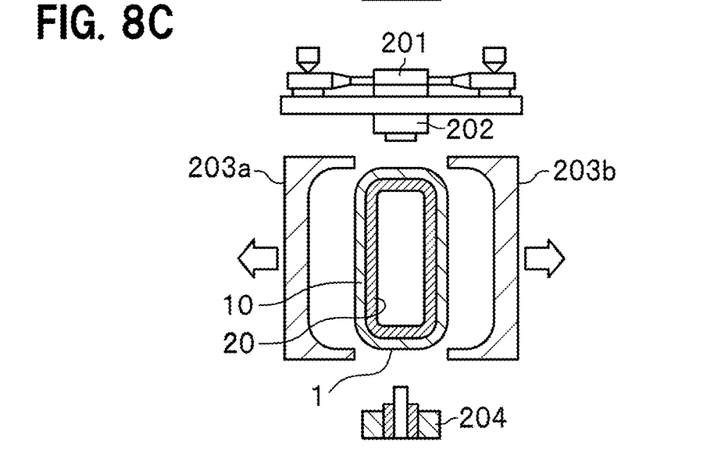

FIGS. 8A to 8C are diagrams showing a fuel tank manufacturing process.

To begin with, the cover member 20 (including the upper cover part 21 and the lower cover part 22) are formed in advance using a metal mold (not illustrated) formed in the shape corresponding to the surface of the tank main body 10 (see FIG. 1). A temperature condition and the like for forming the cover member are set as appropriate depending on types of cover member 20. The temperature at which to form the cover member 20 using the PP-PE fiber is set, for example, at a temperature at which the PE resin melts but the PP resin does not melt.

Thereafter, as shown in FIG. 8A, the thus-formed cover member 20 (including the upper cover part 21 and the lower cover part 22) is fixed to the inside of a mold 203 for blow molding. An apparatus shown in FIG. 8A is a blow molding apparatus 200 which forms the fuel tank 1 by blow molding. The blow molding apparatus 200 includes: an extruder 201 which extrudes the molten resin; dies 202 connected to the extruder 201; the mold 203 for blow molding disposed under the dies 202; and an air supplier 204 which sends air for expanding the resin.

The mold 203 for blow molding includes a first half body 203a and the second half body 203b which are openable and closable. The first and second half bodies 203a, 203b includes cavities 203c, 203d in which to set the formed cover member 20 (including the upper cover part 21 and the lower cover part 22).

After that, as shown in FIG. 8B, the molten resin extruded from the extruder 201 is made to pass through the dies 202 to from a cylinder-shaped a parison 205. Subsequently, the parison 205 is made to be held between the first and second half bodies 203a, 203b of the mold 203 for blow molding. Thereafter, a nozzle of the air supplier 204 is pierced into the parison 205, and air is supplied to the inside of the parison 205 from the air supplier 204. This expands the parison 205, and brings the parison 205 into intimate contact with the inner surface of the cover member 20 (including the upper cover part 21 and the lower cover part 22). During this, negative-pressure suction is applied to the cover member 20 (including the upper cover part 21 and the lower cover part 22) so as to bring the cover member 20 (including the upper cover part 21 and the lower cover part 22) into intimate contact with the cavities 203c, 203d. Once the parison 205 comes into intimate contact with the cover member 20 (including the upper cover part 21 and the lower cover part 22), heat of the tank main body 10 melts the surface (inner surface) of the cover member 20, and the cover member 20 and the tank main body 10 are thereby fused together.

Thereafter, the mold 203 for blow molding is cooled, and the fuel tank 1 is accordingly is cooled. After the surface temperature of the tank reaches a predetermined temperature or lower, the fuel tank 1 is taken out of the mold 203 for blow molding by opening the first and second half bodies 203a, 203b of the mold 203 for blow molding, as shown in FIG. 8C. Incidentally, the negative-pressure suction is stopped before the mold 203 for blow molding is opened.

The first embodiment uses the cover member 20 formed of (by weaving) the threads made of the fiber-reinforced composite material (PPFRTP) containing the thermoplastic resin. Thereby, the first embodiment has a configuration as follows: during the forming of the fuel tank 1, the resin (for example, the polyethylene resin) of the surface of the cover member 20 and the resin (for example, the polyethylene) of the surface of the tank main body 10 melt, and the cover member 20 is thereby bonded to the surface of the tank main body 10.

The fusibility between the tank main body 10 and the cover member 20 is (3) a prerequisite for the smoothness of the of the fabric surface. Specifically, the existence of spaces between the surface of the tank main body 10 and the cover member 20 decreases the number of contact points between the tank main body 10 and the cover member 20, and makes spaces more likely occur when the cover member 20 is fused to the tank main body 10. This results in deterioration in the fusibility between the tank main body 10 and the cover member 20, and accordingly makes the cover member 20 more likely to come off the tank main body 10.

Meanwhile, the satin weave has a smaller number of weave points (cross points), and makes spaces more likely to occur between the cross points. In contrast, the twill weave has a larger number of weave points (cross points), and accordingly makes the cover member 20 come into contacts with the tank main body at highly dense points. For this reason, the use of the cover member 20 having the twill weave structure makes it possible to enhance the fusibility between the tank main body 10 and the cover member 20.

Figure 9A:
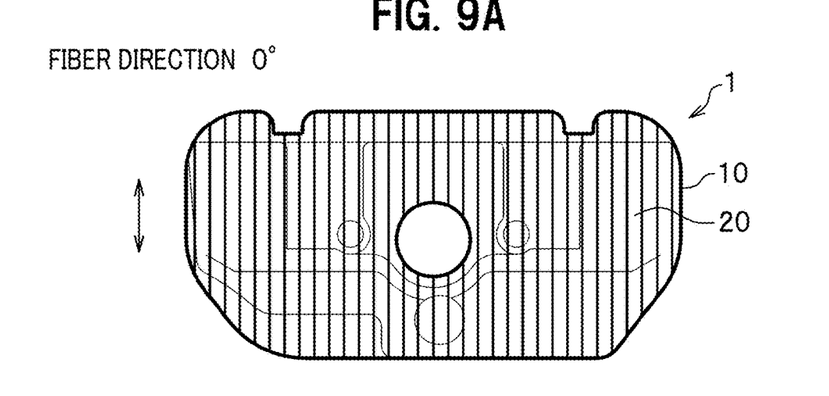
FIGS. 9A and 9B are diagrams showing how the twill weave cover member is arranged at a fiber direction of 0° and at a fiber direction of 45°, respectively.
Figure 9B:
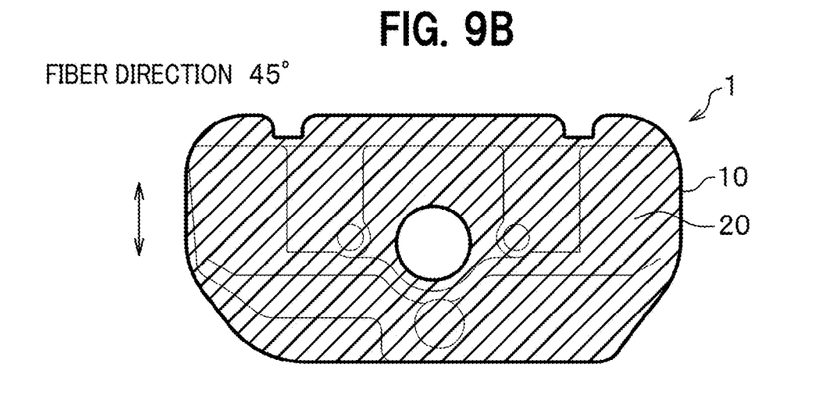

FIGS. 9A and 9B are diagrams showing how the twill weave cover member is arranged at a fiber direction of 0° and at a fiber direction of 45°, respectively. Incidentally, the fiber direction is the one at which each core material 31 (see FIG. 7) made of the PP resin extends. When the fiber direction is at 0°, the direction of the warp threads (or the weft threads) coincides with a front-rear direction of the fuel tank 1 (a direction indicated with an up-down arrow in FIG. 9A), as indicated with multiple solid lines in FIG. 9A. On the other hand, when the fiber direction is at 45°, the direction of the warp threads (or the weft threads) tilts at 45° to the front-rear direction of the fuel tank 1 (a direction indicated with an up-down arrow in FIG. 9B), as indicated with multiple solid lines in FIG. 9B.

The amount of displacement is approximately 16 mm when the fiber direction is at 0° in the case shown in FIG. 9A. Meanwhile, the amount of displacement is approximately 16 mm where the fiber direction is equal at 45° in the case shown in FIG. 9B. A result like this has been obtained that the amount of displacement at a fiber direction of 0° is substantially equal to the amount of displacement at a fiber direction of 45°.

The complicated shape of the fuel tank 1 would otherwise cause a problem that the unevenness of the tank disturbs the fiber direction during the forming of the cover member 20. In the first embodiment, however, the forming of the cover member 20 by twill weaving makes the cover member 20 strong against the elongation in the vertical and horizontal directions, and accordingly rigid no matter what the fiber direction is at. This makes it possible to enhance the robustness of the production technique. Furthermore, since the twill weave cover member 20 can be formed with no fiber direction taken into consideration, the production of the cover member 20 is easy.

Figure 10:
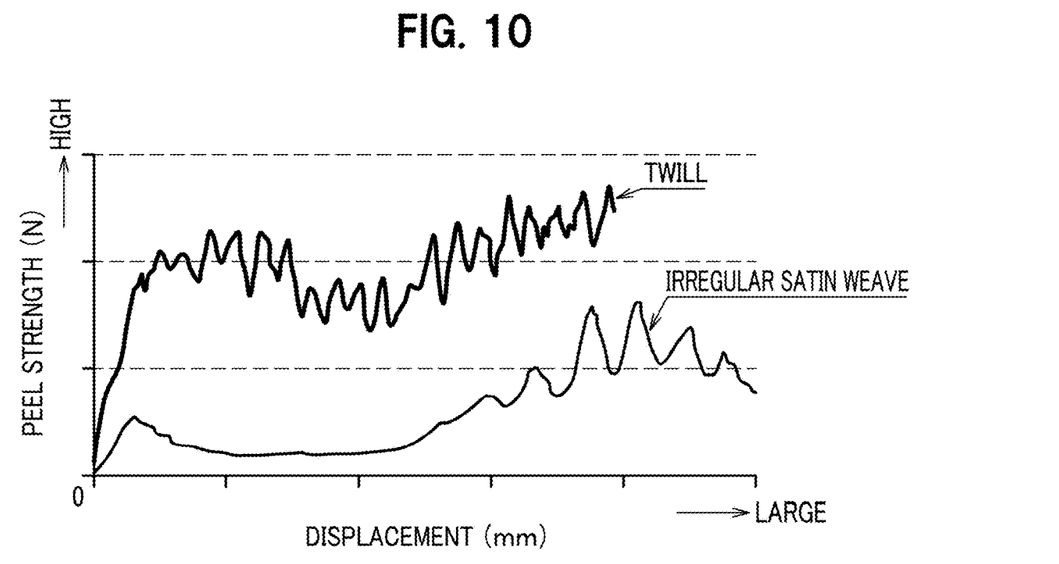
FIG. 10 is a graph showing a relationship between peel strength and displacement in each of a twill weave sheet and an irregular satin weave sheet.

FIG. 10 is a graph showing a relationship between peel strength and displacement in each of the twill weave sheet and an irregular satin weave sheet. In FIG. 10, a thick line represents the twill weave sheet, while a thin line represents the irregular satin weave sheet. The irregular satin weave is a kind of satin weave in which weave points (cross points) are irregularly formed.

Specifically, strip-shaped test pieces were formed of the same material (the material containing the polyethylene resin in the top skin layer 11a, see FIG. 2) as is the tank main body 10. As the cover member 20, sheets were formed, respectively, by twill-weaving, and by irregular satin-weaving, the resin with the core-sheath structure (in which the core material was the polypropylene resin, and the sheath material was the polyethylene resin). Incidentally, conditions for fusing the test pieces and the sheets were set as follows: the fusing temperature was 180°, and the fusing time length was 1 minute. The test speed was set at 20 mm/minute. Using a tensile tester, it was observed whether interfacial peeling occurred in the fused surfaces of each sheet and the corresponding test piece.

As shown in a graph in FIG. 10, the test result was that higher peel strength (peeling strength) was obtained from the twill weave sheet than from the irregular satin weave. Furthermore, the base material (the polyethylene resin) broke in the twill weave sheet, while the interfacial peeling occurred in the irregular satin weave. From the above results, it was confirmed that: the fusing strength was different between the twill weave sheet and the irregular satin weave sheet; and the fusibility of the twill weave sheet was higher than that of the irregular satin weave.

Figure 11A:
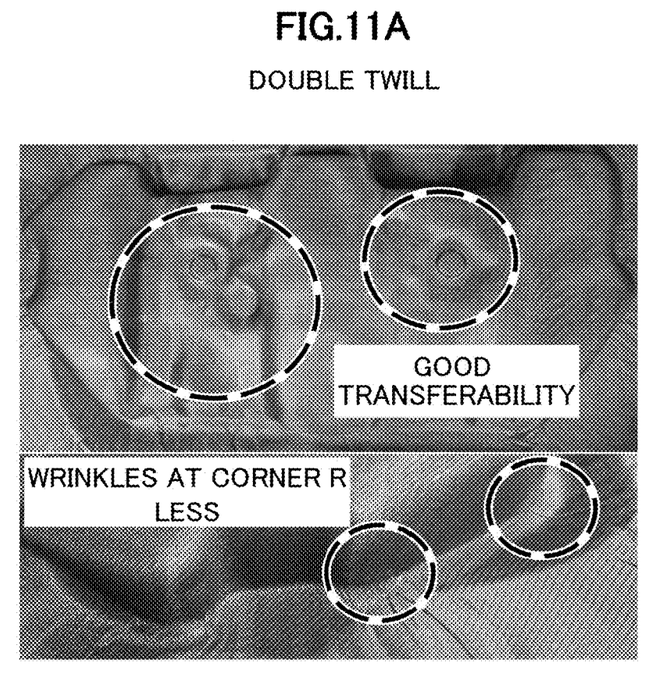
FIGS. 11A and 11B show results of testing moldabilities of a double-twill weave cover member and an irregular satin weave cover member, respectively.
Figure 11B:
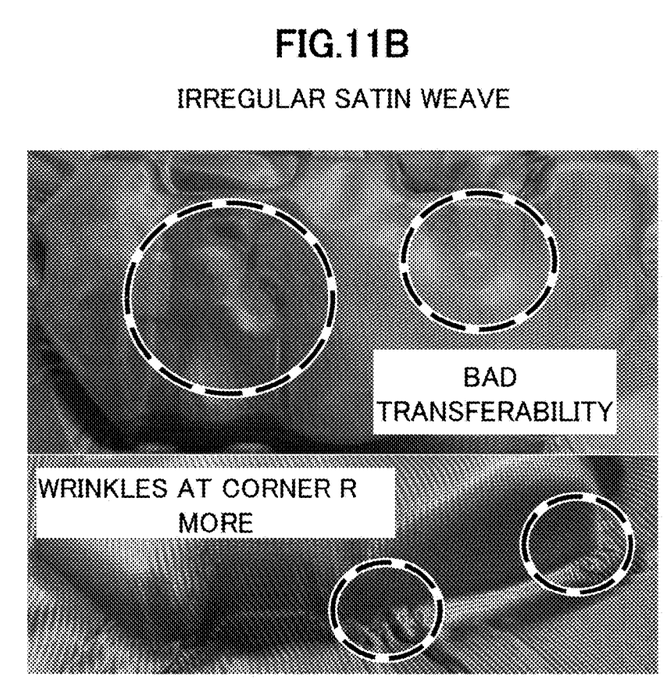

FIGS. 11A and 11B show results of testing moldabilities of the double-twill weave according to the first embodiment and the irregular satin weave according to the comparative example, respectively. For the purpose of checking the influence of each fabric on the moldability of the cover member, a comparison was made between the double-twill weave and the irregular satin weave by press-forming the cover members into a shape which required the cover members to be deeply drawn. Upper halves of the FIGS. 11A and 11B are photographs showing all the upper surfaces of the thus formed cover members which were ready to be attached to the tank main bodies 10, respectively. Lower halves of FIGS. 11A and 11B are magnified photographs of the peripheral corner portions of the tank main bodies 10, respectively. The double-twill weave had the cross-sectional structure which has been discussed using FIGS. 6A and 6B.

As shown in the upper half of FIG. 11B, it was confirmed that the irregular satin weave as the comparative example did not have sufficient transferability in areas circled with dashed lines. In other words, it was confirmed that the irregular satin weave sheet did not follow the shapes of circular protrusions. In addition, as shown in areas surrounded with circles in the lower half of FIG. 11B, it was confirmed that many creases occurred in corner portions (corners R).

Meanwhile, as shown in the upper half of FIG. 11A, it was confirmed that the twill weave as the first embodiment had excellent transferability in areas surrounded with circles. In other words, it was confirmed that the cover member including the twill weave sheets sufficiently followed the shapes of circular protrusions. In addition, as shown in areas surrounded with circles in the lower half of FIG. 11A, it was confirmed that the number of creases occurring in corner portions (corners R) was small.

From the above results, it was confirmed that the twill weave (the double-twill weave) had better moldability than the satin weave (the irregular satin weave). One may consider that a reason why the irregular satin weave had poor moldability and caused many creases in the corner portions was that the number of weave points (cross points) was small in the irregular satin weave and the weave points (cross points) went out of place when the irregular satin weave was folded. Because the irregular satin weave was not bent at places where the irregular satin weave was folded, the weave points (cross points) went out of place, and portions of the irregular satin weave came off the test piece. In contrast to this, since the twill weave had many weave points (cross points) and accordingly inhibits the weave points (cross points) from going out of place when the twill weave cover member was folded, the twill weave cover member had excellent moldability and were able to reduce the occurrence of creases in the corner portions.

Figure 12:
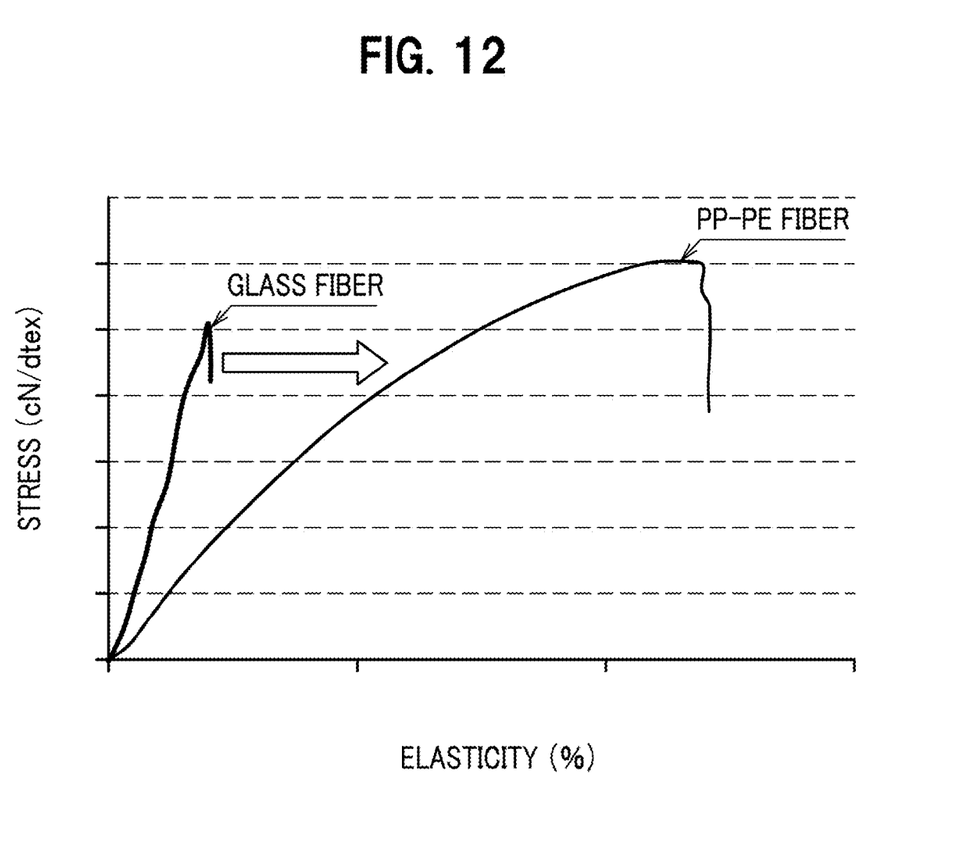
FIG. 12 is a graph showing a relationship between stress and extensibility of each of polypropylene-polyethylene (PP-PE) fiber and fiberglass.

FIG. 12 is a graph showing a relationship between stress and extensibility (relative length difference across the width of a strip) of each of the PP-PE fiber and fiberglass. The PP-PE fiber has the core-sheath structure in which a fiber (continuous fiber) made of a polypropylene resin (PP) is coated with a polyethylene resin (PE) matrix, and one thread is made of a strand of PP-PE fibers. On the other hand, the fiberglass is a fiber-reinforced plastic (GFRP) obtained by coating a fiber glass with a thermosetting resin.

As shown in FIG. 12, a result of a test using a tensile tester was as follows. The fiberglass hardly elongated, and broke when it elongated by approximately 2%. On the other hand, the PP-PE fiber broke when it elongated by extensibility (relative length difference across the width of a strip) more than six times that of the fiberglass. This result shows that the PP-PE fiber had an increased elastic deformation range as indicated with a double arrow in FIG. 12. The use of the PP-PE fiber for the cover member 20, therefor, enhances the followability of the cover member 20 to the complicated shape of the fuel tank 1.

Since like this, the sheet forming the cover member 20 is required to follow the tank main body 10 formed in the complicated shape, (4) the thread elongation is a prerequisite for the followability. The large elongation of this thread (the PP-PE fibers) enhances the followability of the cover member 20 to the shape of the surface of the tank main body 10, and accordingly makes the moldability of the cover member 20 better. Conversely, an excessive elongation of the PP-PE fiber worsens the effect of inhibiting the expansion of the tank main body 10. With these taken into consideration, the first embodiment inhibits the expansion of the tank main body 10 by reinforcing the tank main body 10 with the cover member 20 which is obtained by twill-weaving PP-PE fibers.

The PE resin in the sheath material of the PP-PE fiber does not have to making a contribution to the elongation because the PE resin melts finally. The strength of the elongation of the PP resin in the core material determines whether the cover member 20 can be formed into the tank shape. Since the melting point of the PE resin is lower than that of the PP resin, the PP resin does not melt when the PE resin melts. The PP resin, therefore, can serve as the core and make the weave structure (twill weave structure) remain as it is.

As discussed above, the fuel tank 1 according to the first embodiment includes: the tank main body 10 made of the resin material (for example, the material containing the polyethylene resin in the top skin layer); and the cover member 20 which is formed using the threads made of the fiber-reinforced composite material containing the thermoplastic resin fusable to the surface of the tank main body 10. The cover member 20 has the twill weave structure at least in its portion fused to the upper surface of the tank main body 10. For this reason, the twill weave cover member 20 has the property of strength against being pulled (no elongation) in the vertical and horizontal directions of the cover member 20. In addition, since the upper surface of the fuel tank 1 receives most of the pressure of the gas produced from the fuel through volatilization than in any other portion of the fuel tank 1, the fusing of the twill weave cover member 20 to at least the upper surface of the fuel tank 1 maximizes the effect of inhibiting the expansion of the fuel tank 1. Incidentally, since the twill weave cover member 20 has the larger weight per unit area and the smooth surface, the twill weave cover member 20 is excellent in fusibility to the tank main body 10.

In addition, in the first embodiment, the sheets 20a, 20b each formed having the twill weave structure are arranged in the layers in the cover member 20, and are fused together (see FIG. 5) Since the cover member 20 is the multilayered one including the sheets 20a, 20b, the cover member 20 can have the increased weight per unit area, and accordingly has the enhanced rigidity.

Furthermore, in the first embodiment, as the twill weave structure, the cover member 20 has the multi-twill weave structure in which: the multiple twill weave sheets 20c, 20d are arranged in the multiple layers; and at least some of the warp threads 20c1 or the weft threads 20c2 of the sheet 20c facing each other each cross the warp threads 20d2 or the weft threads 20d1 of the sheet 20d facing each other (see FIG. 6). Since in the multi-twill weave structure, the stacked sheets 20c, 20d are joined together by the cross between the threads (the cross between the warp threads 20c1 and the weft threads 20d1, as well as the cross between the weft threads 20c2 and the warp threads 20d2), the cover member 20 having the higher rigidity can be obtained. Furthermore, although the sheets 20a, 20b increases the number of manufacturing steps since the sheets 20a, 20b need to be woven individually and thereafter stacked together such that each warp thread crosses the weft threads by going over one, then under the next, and so on, the sheets 20c, 20d need no such increased steps and can therefore reduce the manufacturing time and the manufacturing costs.

Moreover, in the first embodiment, the threads which are made of the fiber-reinforced composite material containing the thermoplastic resin fusible to the surface of the tank main body 10 each have the core-sheath structure in which the fiber made of the polypropylene resin is coated with the polyethylene resin. The PP-PE fiber, therefore, has the higher extensibility (relative length difference across the width of a strip) than the glass fiber and the carbon fiber (see FIG. 12). Thus, the cover member 20 made of the PP-PE fiber has the better followability to the complicated shape of the fuel tank 1, and accordingly the enhanced moldability.

Besides, in the first embodiment, the surface (the top skin layer 11a) of the tank main body 10 is made of the polyethylene resin (see FIG. 2). Since the combination of the top skin layer 11a made of the PE resin with the cover member 20 made of the PP-PE fiber enhances the fusing efficiency since the combination leads to the fusion between the same types of resins.

Second Embodiment

Figure 13:
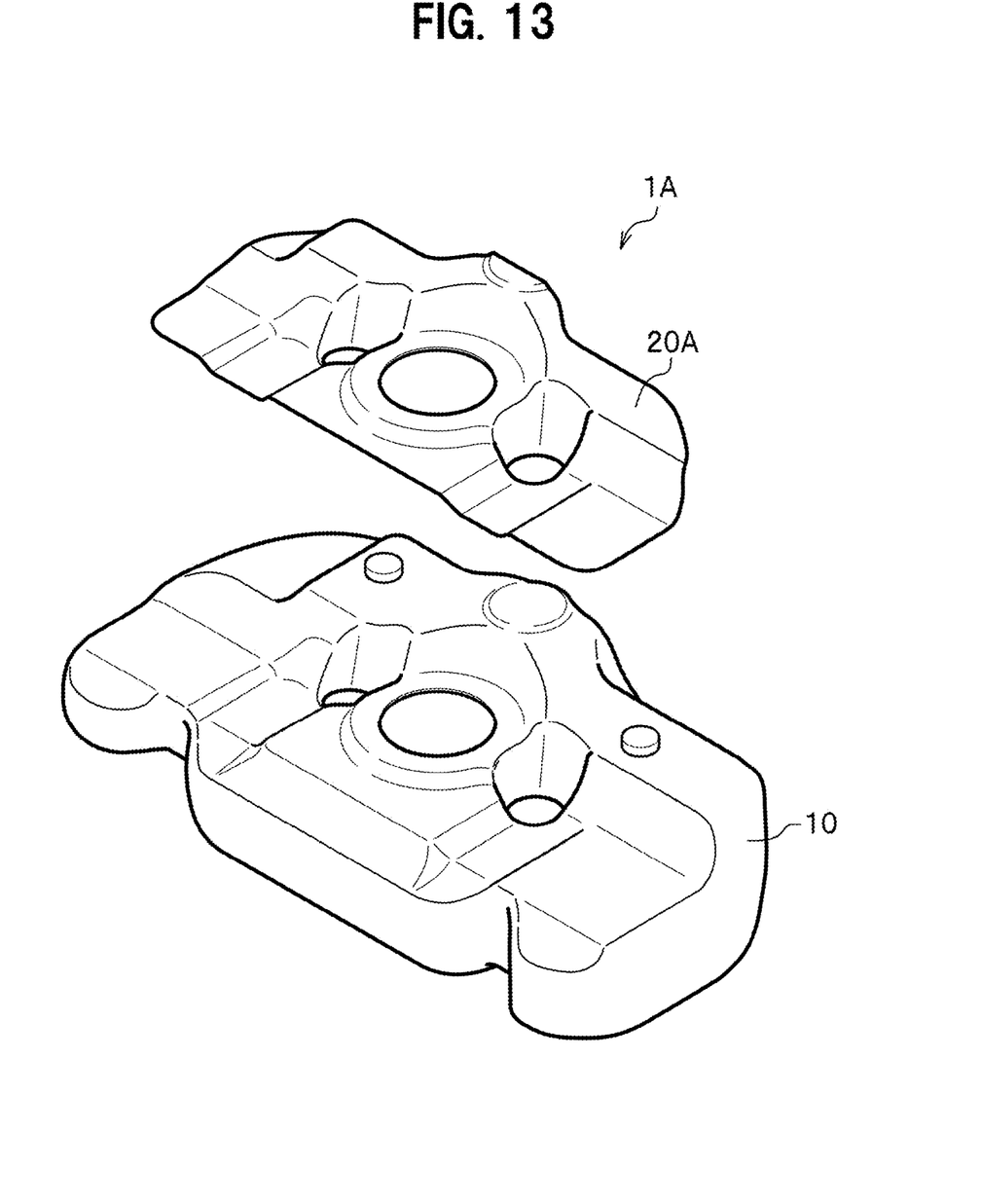
FIG. 13 is a perspective diagram showing a fuel tank according to a second embodiment.

FIG. 13 is a perspective diagram showing a fuel tank according to a second embodiment.

As shown in FIG. 13, in the second embodiment, a cover member 20A is arranged on only the upper surface of the fuel tank 1A, unlike in the first embodiment. The rest of the configuration of the second embodiment is the same as that of the first embodiment. Like in the cover member 20 according to the first embodiment, in the cover member 20A, the threads which are made of the fiber-reinforced composite material (PPFRTP) containing the thermoplastic resin fusible to the surface of the tank main body 10 are each formed having the core-sheath structure.

Like the first embodiment, the second embodiment makes the effect of inhibiting the expansion of the fuel tank 1A higher. In addition, since the cover member 20A is formed by twill weaving, the cover member 20A has a large weight per unit square and a smooth surface, and is accordingly excellent in fusibility to the tank main body 10.

Moreover, since the cover member 20A is arranged partially, but not entirely, on the tank main body 10, the second embodiment can manufacture the cover member 20A more economically than the first embodiment manufactures the cover member 20.

Although the second embodiment has been described using the case where the cover member 20A is made of the single sheet, the cover member may be dividedly arranged, for example, as indicated with regions R1, R2 in FIG. 3A.

Although the foregoing descriptions have been provided for the embodiments, the present invention is not limited to the embodiments, and can be carried out in various modes. Although the first embodiment has been described using the case where all the cover member 20 is formed by twill weaving, the tank main body 10 may be formed such that: portions of the tank main body 10 where the tank main body 10 changes its shape largely have the twill weave structure; and the other portions of the tank main body 10 have a different weave structure. Otherwise, the tank main body 10 may be formed such that: portions of the tank main body 10 where the tank main body 10 changes its shape largely have the twill weave structure; and the other portions of the tank main body 10 have a non-weave structure.

What is claimed is:

1. A fuel tank comprising:
a tank main body made of a resin material; and
a cover member which is formed using threads made of a fiber-reinforced composite material containing a thermoplastic resin fusible to a surface of the tank main body, wherein
the cover member has a twill weave structure at least in its portion fused to the upper surface of the tank main body, and
the threads each have a core-sheath structure in which a fiber made of a polypropylene resin is coated with a polyethylene resin.

2. The fuel tank according to claim 1, wherein sheets each formed having the twill weave structure are arranged in a plurality of layers in the cover member, and are fused together.

3. The fuel tank according to claim 1, wherein as the twill weave structure, the cover member has a multi-twill weave structure in which
a plurality of single twill weave sheets are arranged in a plurality of layers, and
at least some of warp threads or weft threads of one of the single twill weave sheets facing each other each cross warp threads or weft threads of another of the single twill weave sheets facing each other.

4. The fuel tank according to claim 1, wherein the surface of the tank main body is made of a polyethylene resin.

5. The fuel tank according to claim 2, wherein the surface of the tank main body is made of a polyethylene resin.

6. The fuel tank according to claim 3, wherein the surface of the tank main body is made of a polyethylene resin.

* * * * *